(12) United States Patent
Huang et al.

(10) Patent No.: US 8,266,766 B2  
(45) Date of Patent: Sep. 18, 2012

(54) HINGE ASSEMBLY

(75) Inventors: Chieh Huang, Shulin (TW); Shan-Yi Yang, Shulin (TW); Ting-Hsien Wang, Shulin (TW)

(73) Assignee: Shin Zu Shing Co., Ltd., Shulin (TW)

( * ) Notice: Subject to any disclaimer, the term of this patent is extended or adjusted under 35 U.S.C. 154(b) by 430 days.

(21) Appl. No.: 12/588,555

(22) Filed: Oct. 20, 2009

(65) Prior Publication Data

US 2011/0088219 A1 Apr. 21, 2011

(51) Int. Cl.
*E05D 11/10* (2006.01)

(52) U.S. Cl. .......... 16/330; 16/303; 16/340; 361/679.27

(58) Field of Classification Search ............ 16/303, 16/330, 337, 340, 297, 386; 455/575.3; 379/433.13; 361/679.27

See application file for complete search history.

(56) References Cited

U.S. PATENT DOCUMENTS

| | | | | |
|---|---|---|---|---|
| 5,894,633 A * | 4/1999 | Kaneko | ......... | 16/306 |
| 6,081,969 A * | 7/2000 | Tanahashi et al. | ......... | 16/337 |
| 6,698,063 B2 * | 3/2004 | Kim et al. | ......... | 16/337 |
| 6,918,159 B2 * | 7/2005 | Choi | ......... | 16/347 |
| 7,219,393 B2 * | 5/2007 | Kida | ......... | 16/221 |
| 7,404,234 B2 * | 7/2008 | Lee et al. | ......... | 16/322 |
| 7,856,695 B2 * | 12/2010 | Tang et al. | ......... | 16/340 |
| 7,954,781 B2 * | 6/2011 | Hsu | ......... | 248/371 |
| 2004/0055114 A1 * | 3/2004 | Lu | ......... | 16/340 |

* cited by examiner

*Primary Examiner* — William L. Miller
(74) *Attorney, Agent, or Firm* — Bacon & Thomas, PLLC

(57) ABSTRACT

A hinge assembly has a pintle, a torque assembly and a resistance assembly. The pintle has a head formed on the pintle. The torque assembly is mounted on the pintle at a first side of the head to provide a force to automatically open the cover relative to the body to a first angle. The resistance assembly is mounted on the pintle at a second side of the head to provide a frictional force to hold the cover at a second angle relative to the body when the cover is closed relative to the body. Accordingly, the cover can be pivoted open relative to the body automatically with the torque provided by the torque assembly.

16 Claims, 6 Drawing Sheets

HINGE ASSEMBLY

BACKGROUND OF THE INVENTION

1. Field of the Invention

The present invention relates to a hinge assembly, and more particularly to a hinge assembly mounted between a body and a cover of an object to allow the cover to automatically pivot open relative to the body.

2. Description of Related Art

An object having a pivoting cover, such as a notebook computer, a digital camera or a cell phone has a body and a hinge mounted between the pivoting cover and the body to allow the cover to be pivoted open. The conventional hinge has a recessed disk, a protrusion disk and a biasing member. The recessed disk and the protrusion disk engage each other, and the biasing member abuts with one of the disks. When the cover is pivoted open relative to the body, one of the disks is pushed away from the other with the protrusion-recess arrangement between the disks and the biasing member is compressed to provide a resistance. With the resistance provided by the hinge, the cover can be held at any desired angle relative to the body.

However, to open the cover, a user has to apply a large force for overcoming the resistance provided by the conventional hinge, but this will cause the operation of the conventional hinge laborious and inconvenient.

To overcome the shortcomings, the present invention tends to provide a hinge assembly to mitigate or obviate the aforementioned problems.

SUMMARY OF THE INVENTION

The main objective of the invention is to provide a hinge assembly mounted between a body and a cover of an object to allow the cover to pivotally open relative to the body automatically.

The hinge assembly has a pintle, a torque assembly and a resistance assembly. The pintle has a head formed on the pintle. The torque assembly is mounted on the pintle at a first side of the head to provide a force to automatically open the cover relative to the body to a first angle. The resistance assembly is mounted on the pintle at a second side of the head to provide a frictional force to hold the cover at a second angle relative to the body when the cover is closed relative to the body.

Other objects, advantages and novel features of the invention will become more apparent from the following detailed description when taken in conjunction with the accompanying drawings.

DETAILED DESCRIPTION OF PREFERRED EMBODIMENT

Figure 1:
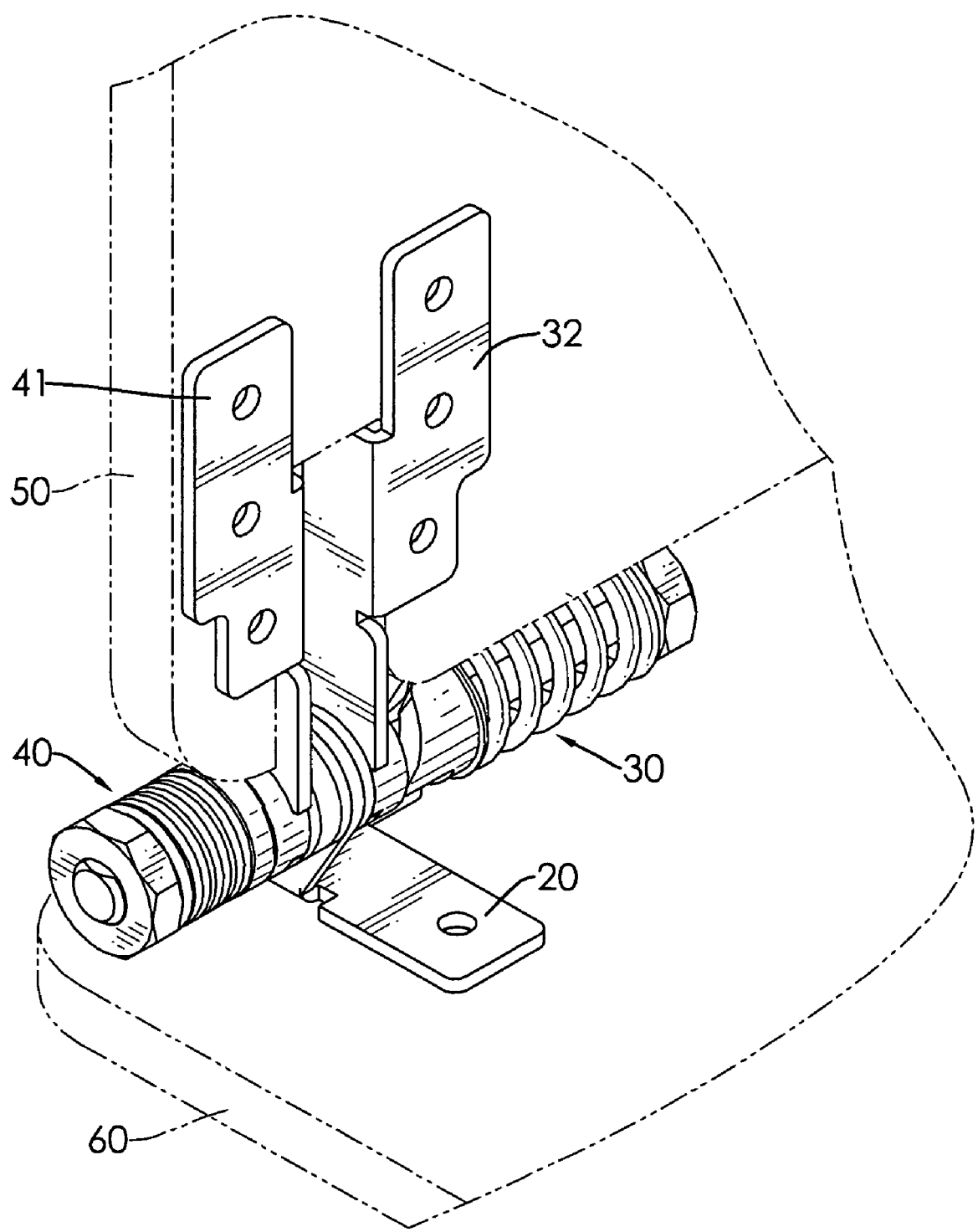
FIG. 1 is a perspective view of a hinge assembly in accordance with the present invention mounted on an object having a body and a cover.
Figure 2:
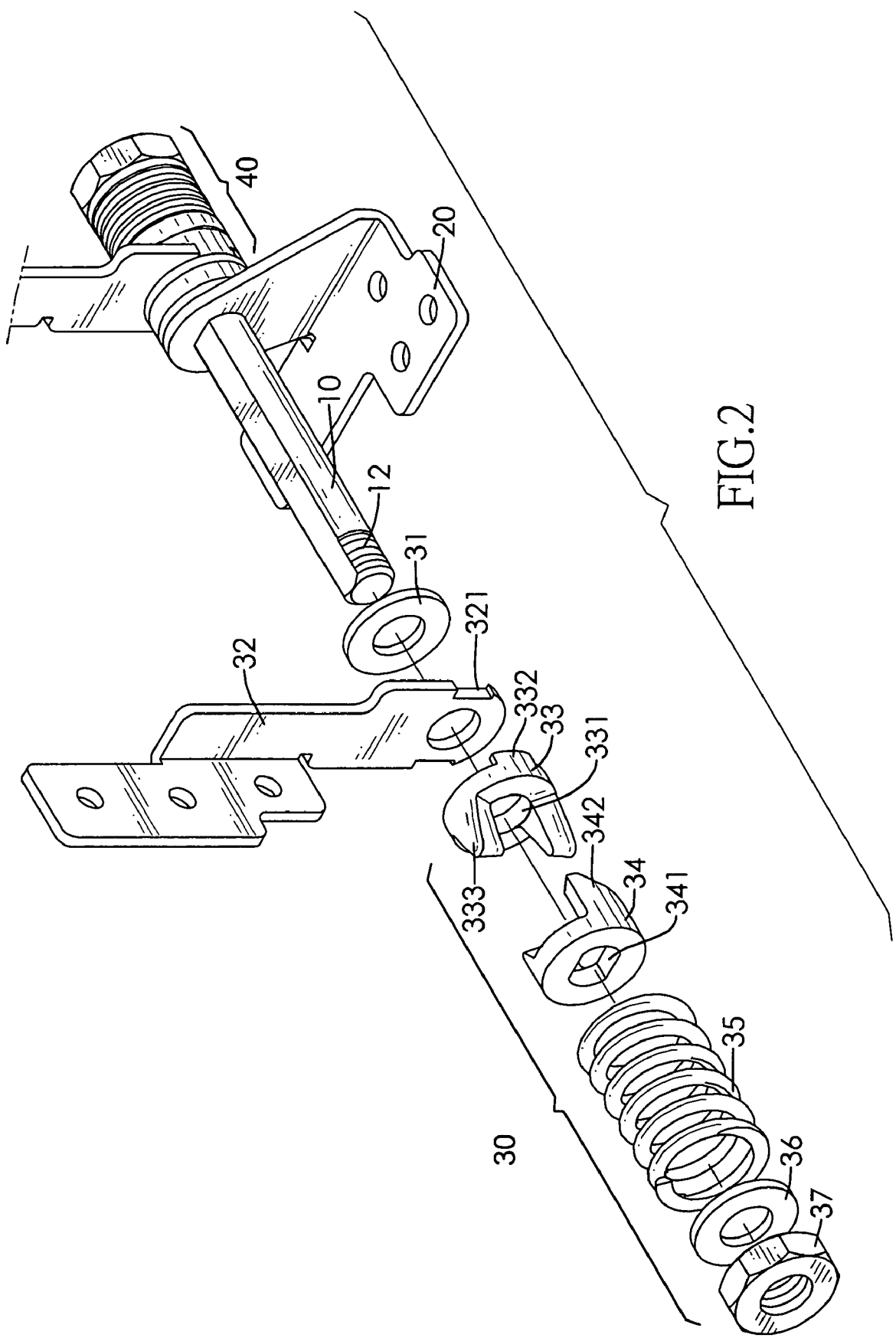
FIG. 2 is an exploded perspective view of the torque assembly of the hinge assembly in FIG. 1.
Figure 4:
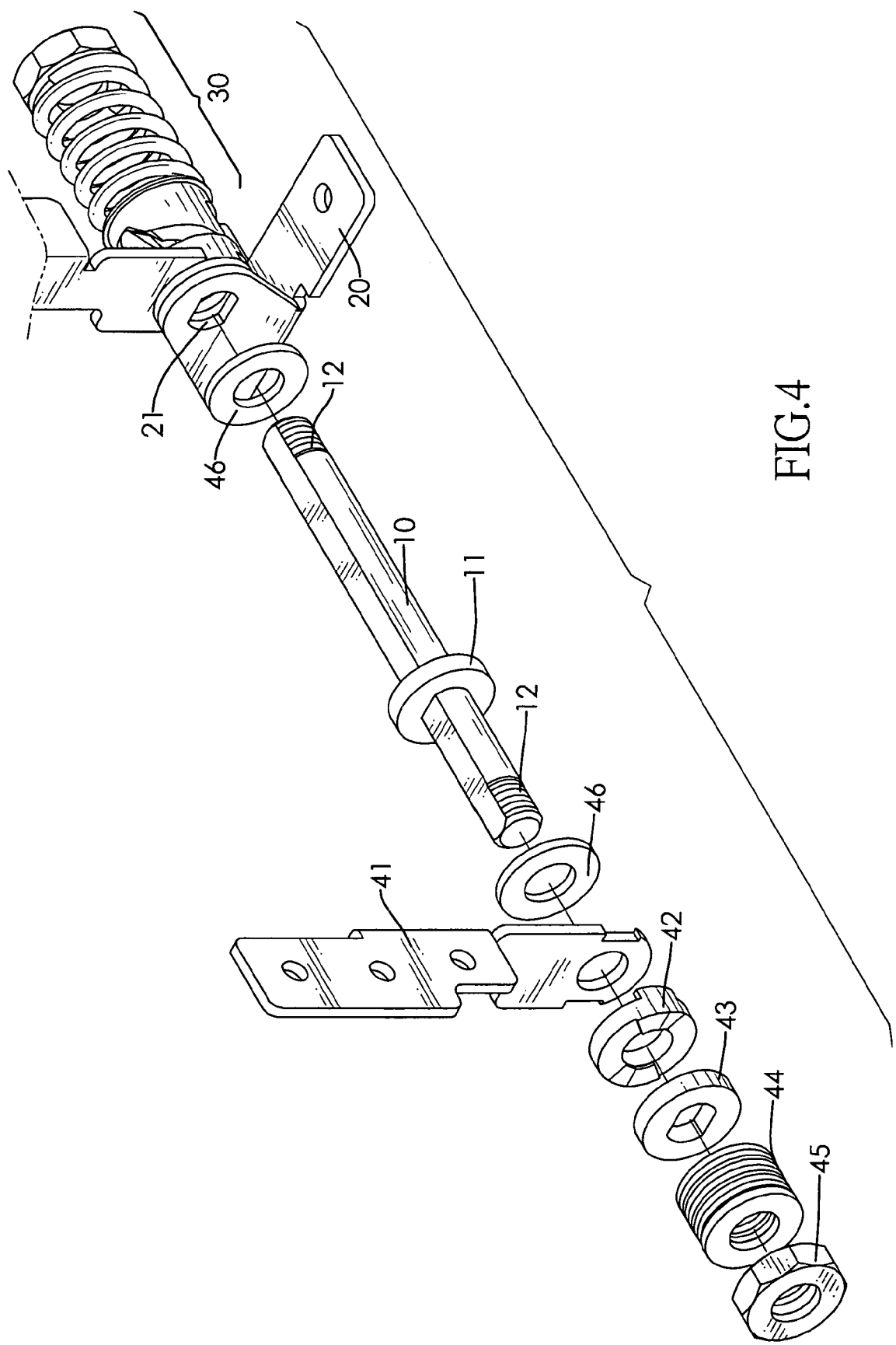
FIG. 4 is an exploded perspective view of the resistance assembly of the hinge assembly in FIG. 1.
Figure 6:
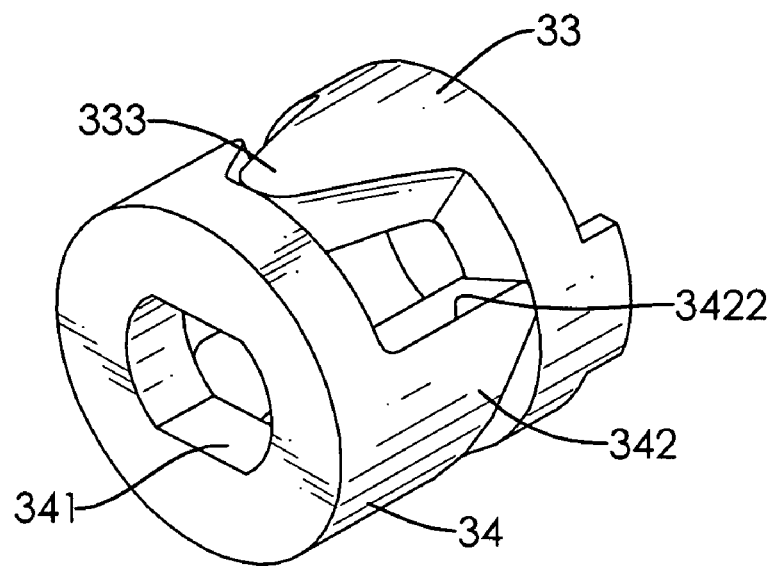
FIG. 6 is another perspective view of the rotating and sliding disks in FIG. 5.

With reference to FIGS. 1, 2 and 4, a hinge assembly in accordance with the present invention is mounted on an object, especially on an electronic object, such as a notebook computer, a digital camera or a cell phone. The object has a body (60) and a pivoting cover (50) connected pivotally to the body (60) by the hinge assembly. The hinge assembly comprises a pintle (10), a torque assembly (30) and a resistance assembly (40). The pintle (10) is connected securely to the body (60) directly or through a securing base (20) and has a non-circular cross section, two ends, a head (11) and two outer threads (12). The head (11) is formed on the pintle (10). The outer threads (12) are formed respectively on the ends of the pintle (10).

The securing base (20) is mounted securely around the pintle (10), abuts with a first side of the head (11), is mounted securely on the body (60) and has a securing hole (21). The securing hole (21) is non-circular, is defined through the securing base (20) and is mounted securely around the pintle (10).

Figure 3:
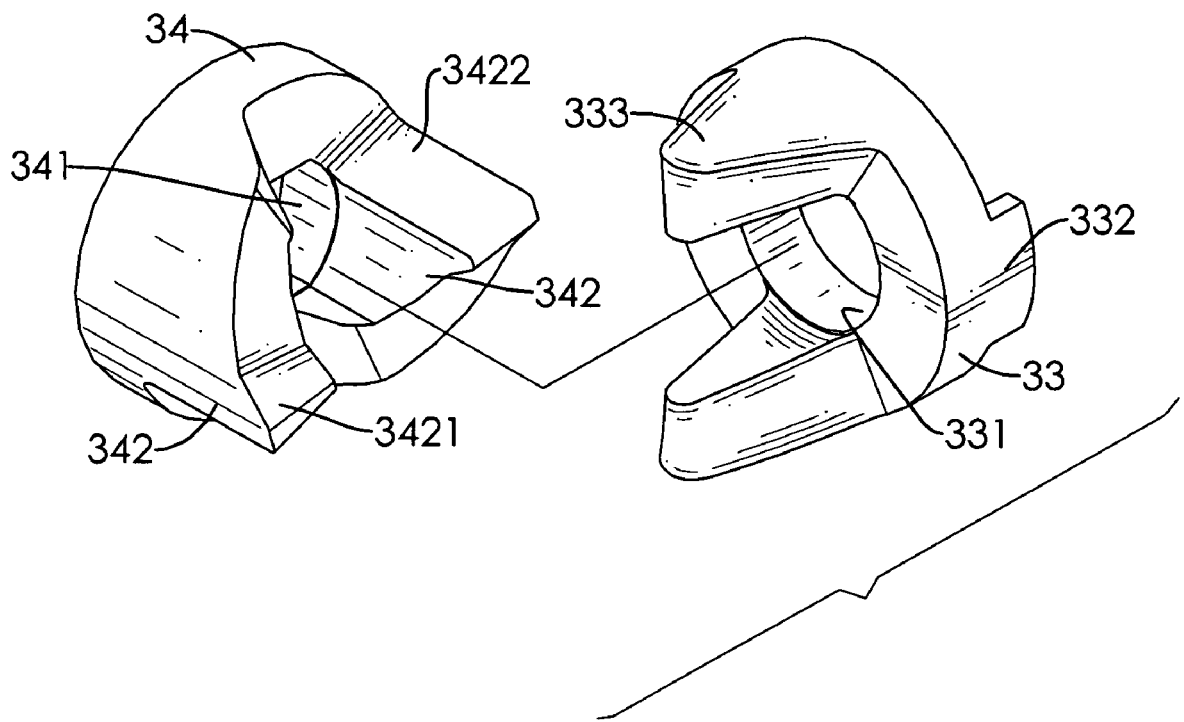
FIG. 3 is an exploded perspective view of the rotating and sliding disks of the torque assembly of the hinge assembly in FIG. 2.
Figure 5:
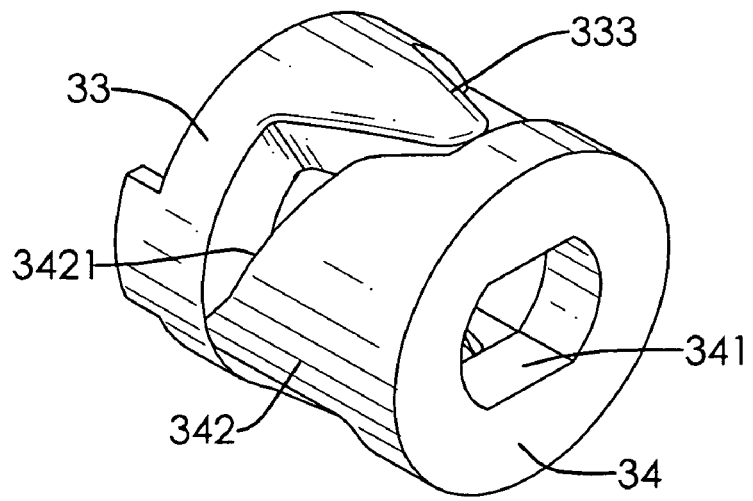
FIG. 5 is a perspective view of the rotating and sliding disks in FIG. 3 when a cover is in an open condition.

With further reference to FIG. 3, the torque assembly (30) is mounted on the pintle (10) at the first side of the head (11) to provide a force to automatically open the cover (50) relative to the body (60) to a first angle. The torque assembly (30) comprises a first rotating leaf (32), a rotating disk (33), a sliding disk (34), a spring (35), a fastener (37), a gasket (36) and a friction disc (31). The first rotating leaf (32) is mounted rotatably around the pintle (10) and has at least one positioning notch (321) defined in the first rotating leaf (32). In the preferred embodiment, two positioning notches (321) are implemented and are defined respectively in two edges of the first rotating leaf (32). The rotating disk (33) is mounted rotatably around the pintle (10), is attached securely to the first rotating leaf (32) and has a through hole (331), at least one positioning tab (332), a pressing face and at least one pressing protrusion (333). The through hole (331) is circular, is defined through the rotating disk (33) and is mounted rotatably around the pintle (10). The at least one positioning tab (332) is formed on and protrudes longitudinally from the rotating disk (33) at a face facing the first rotating leaf (32) and engages respectively the at least one positioning notch (321) in the first rotating leaf (32). In the preferred embodiment, two positioning tabs (332) are implemented and formed respectively at two ends of a diameter of the rotating disk (33). The pressing face is opposite to the first rotating leaf (32). The at least one pressing protrusion (333) is formed on the pressing face. In the preferred embodiment, two pressing protrusions (333) are implemented, are formed respectively on two ends of a diameter of the rotating disk (33) and may be triangular. Each pressing protrusion (333) has an apex.

The sliding disk (34) is mounted slidably on the pintle (10), abuts with the rotating disk (33) and has a central hole (341), a pressed face and at least one pressed portion (342). The central hole (341) is non-circular, is defined through the sliding disk (34) and is mounted slidably around the pintle (10). The pressed face abuts with the apexes of the pressing protrusions (333) of the rotating disk (33). The at least one pressed portion (342) is formed on the pressed face and respectively abuts slidably with the at least one pressing protrusion (333). In the preferred embodiment, two pressed portions (342) are implemented and abut respectively with the pressing protrusions (333) on the rotating disk (33). Each pressed portion (342) has an oblique pressed edge (3421) and a stop edge (3422). The pressed edge (3421) is formed on one side of the pressed portion (342) and abuts slidably with the apex of a corresponding pressing protrusion (333). The stop edge (3422) is formed on the other side of the pressed portion (342) and is perpendicular to the pressed face.

The spring (35) is mounted around the pintle (10) and abuts against the sliding disk (34).

The first fastener (37) is mounted on the pintle (10) to hold the first rotating leaf (32), the rotating disk (33), the sliding disk (34) and the spring (35) on the pintle (10) and may be a nut screwed with one of the outer threads (12) on the pintle (10).

The gasket (36) is mounted around the pintle (10) between the spring (35) and the first fastener (37).

The friction disc (31) is mounted around the pintle (10) between the first rotating leaf (32) and the head (11) on the pintle (10).

The resistance assembly (40) is mounted on the pintle (10) at a second side of the head (11) to provide a frictional force to hold the cover (50) at a second angle relative to the body (60) when the cover (50) is closed relative to the body (60). The resistance assembly (40) comprises a second rotating leaf (41), a pressing disk (42), a pressed disk (43), a protrusion-recess arrangement, a biasing assembly (44), a second fastener (45) and two friction discs (46). The second rotating leaf (41) is mounted rotatably around the pintle (10), can abut the second side of the head (11) and is mounted securely on the cover (50). The pressing disk (42) is mounted rotatably around the pintle (10) and is attached securely to the second rotating leaf (41) with notches and tabs. The pressed disk (43) is mounted slidably on the pintle (10) and abuts with the rotating disk (42). The protrusion-recess arrangement is formed on faces of the pressing and pressed disks (42,43) facing to each other. The protrusion-recess arrangement may be conventional to allow the pressed disk (43) to be pushed away from the pressing disk (42) when the pressing disk (42) is rotating. The biasing assembly (44) is mounted around the pintle, abuts against the sliding disk (43) and may comprise multiple resilient discs. The second fastener (45) is mounted on the pintle (10) to hold the second rotating leaf (41), the pressing disk (42), the pressed disk (43) and the biasing assembly (44) on the pintle (10) and may be a nut screwed with a corresponding outer thread (12) on the pintle (10). The friction discs (46) are mounted around the pintle (10), and one is mounted between the second rotating leaf (41) and head (11) and the other is mounted between the head (11) and the securing base (20).

With the arrangement of the resistance assembly, when the cover (50) is pivoted open or closed relative to the body (60), the pressed disk (43) can be pushed away from the pressing disk (42) to compress the biasing assembly (44). Consequently, a resistance is provided for rotating the hinge assembly.

With reference to FIGS. 1, 2, 5 and 6, when the cover (50) is in an open condition relative to the body (60), the pressing protrusions (333) on the rotating disk (33) abut with the pressed face on the sliding disk (34).

Figure 7:
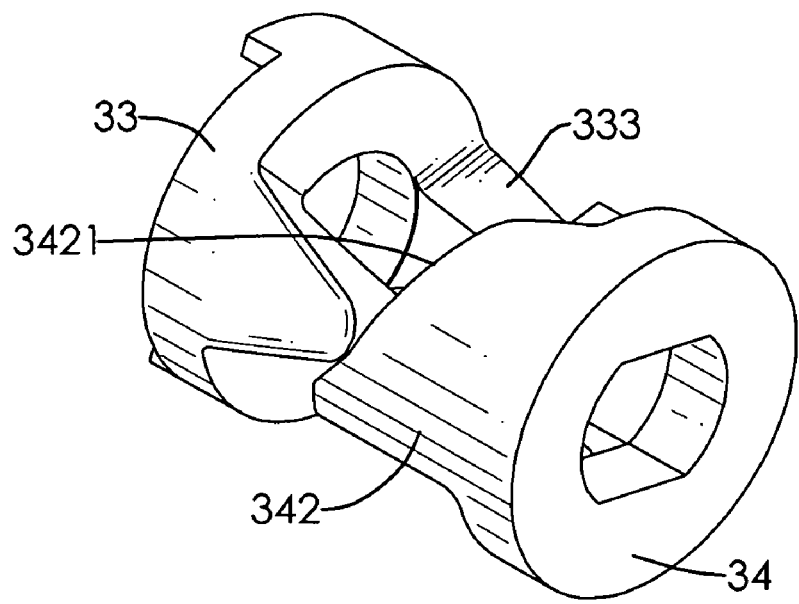
FIG. 7 is an operational perspective view of the rotating and sliding disks in FIG. 3 showing the sliding disk being pushed away from the rotating disk when the cover is at a closed condition.

With further reference to FIG. 7, when the cover (50) is closed relative to the body (60), the rotating disk (33) is rotated with the first rotating leaf (32) to make the apexes of the pressing protrusions (333) sliding along the oblique pressed edges (3421) on the corresponding pressed portions (342) of the sliding disk (34). Consequently, the sliding disk (34) can be pushed away from the rotating disk (33) to slide along the pintle (10) and compress the spring (35). A latch can be mounted between the cover (50) and the body (60) to hold the cover (50) in a closed condition relative to the body (60).

When the latch is unlocked, the sliding disk (34) can be pushed to slide closely to the rotating disk (33). With abutment between the oblique pressed edges (3421) and the apexes of the pressing protrusions (333), the rotating disk (33) and the first rotating leaf (32) are rotated. Accordingly, the cover (50) can be automatically opened with the force provided by the spring (44). The open angle of the cover (50) can be limited with the abutment between the pressing protrusions (333) and the stop edges (3422) of the pressed portions (342).

Figure 8:
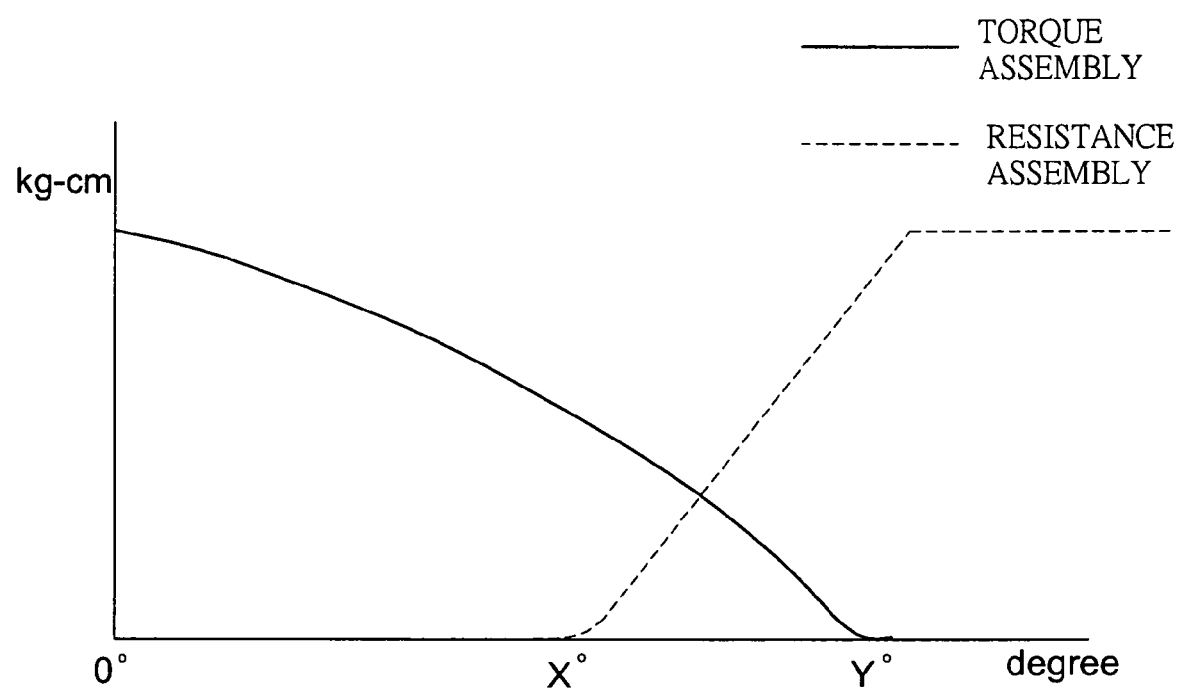
FIG. 8 is a plot showing the torque-resistance provided by the resistance assemblies of the hinge assembly in FIG. 1.

With further reference to FIG. 4, when the cover (50) is automatically opened with the torque provided by the torque assembly (30), the pressed disk (43) of the resistance assembly (40) is pushed away from the pressing disk (42) and the biasing assembly (44) is compressed. Consequently, a resistance is provided by the resistance assembly (40) during the automatic opening process of the cover (50) to keep the cover (50) from pivoting at a high speed and being damaged. With reference to FIG. 8, with the torque provided by the torque assembly (30), the cover (50) can be pivoted open quickly until an angle of X (about 90°). At the angle of X, the resistance assembly (40) starts to provide a resistance to slow down the pivoting speed of the cover (50) until an angle of Y (about 110° to 135°). At the angle of Y, the apexes of the pressing protrusions (333) on the rotating disk (33) abut with the pressed face of the sliding disk (34), and the cover (50) is held in an open condition.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge assembly for an object having a body and a cover, and the hinge assembly comprising:
   a pintle having a head formed on the pintle;
   a torque assembly mounted on the pintle at a first side of the head and comprising
   a first rotating leaf mounted rotatably around the pintle;
   a rotating disk mounted rotatably around the pintle, attached securely to the first rotating leaf and having
   a pressing face opposite to the first rotating leaf; and
   at least one pressing protrusion formed on the pressing face;
   a sliding disk mounted slidably on the pintle, abutting with the rotating disk and having
   a pressed face abutting with the at least one pressing protrusion on the rotating disk; and
   at least one pressed portion formed on the pressed face and respectively abutting slidably the at least one pressing protrusion, and each one of the at least one pressed portion having an oblique pressed edge abutting slidably with a corresponding pressing protrusion;
   a spring mounted around the pintle and abutting against the sliding disk; and
   a first fastener mounted on the pintle to hold the first rotating leaf, the rotating disk, the sliding disk and the spring on the pintle; and a resistance assembly mounted on the pintle at a second side of the head and comprising
a second rotating leaf mounted rotatably around the pintle;
a pressing disk mounted rotatably around the pintle and attached securely to the second rotating leaf;
a pressed disk mounted slidably on the pintle and abutting with the rotating disk;
a protrusion-recess arrangement formed on faces of the pressing and pressed disks facing to each other;
a biasing assembly mounted around the pintle and abutting against the sliding disk; and
a second fastener mounted on the pintle to hold the second rotating leaf, the pressing disk, the pressed disk and the biasing assembly on the pintle.

2. The hinge assembly as claimed in claim 1, wherein
the first rotating leaf of the torque assembly further has at least one positioning notch defined in the first rotating leaf; and
the rotating disk of the torque assembly has at least one positioning tab formed on and protruding from the rotating disk and engaging respectively the at least one positioning notch in the first rotating leaf.

3. The hinge assembly as claimed in claim 2, wherein
the pintle has a non-circular cross section;
the rotating disk of the torque assembly has a circular through hole defined through the rotating disk and mounted rotatably around the pintle; and
the sliding disk of the torque assembly has a non-circular central hole defined through the sliding disk and mounted slidably around the pintle.

4. The hinge assembly as claimed in claim 3, wherein the torque assembly further has a gasket mounted around the pintle between the spring and the fastener.

5. The hinge assembly as claimed in claim 4, wherein the torque assembly further has a friction disc mounted around the pintle between the first rotating leaf and the head on the pintle.

6. The hinge assembly as claimed in claim 1, wherein
the pintle has a non-circular cross section;
the rotating disk of the torque assembly has a circular through hole defined through the rotating disk and mounted rotatably around the pintle; and
the sliding disk of the torque assembly has a non-circular central hole defined through the sliding disk and mounted slidably around the pintle.

7. The hinge assembly as claimed in claim 1, wherein the torque assembly further has a gasket mounted around the pintle between the spring and the first fastener.

8. The hinge assembly as claimed in claim 1, wherein the torque assembly further has a friction disc mounted around the pintle between the first rotating leaf and the head on the pintle.

9. An object comprising:
a body; and
a pivoting cover connected pivotally to the body with a hinge assembly, wherein the hinge assembly comprises
a torque assembly connected to the cover, mounted on the pintle at a first side of the head and comprising
a first rotating leaf mounted rotatably around the pintle;
a rotating disk mounted rotatably around the pintle, attached securely to the first rotating leaf and having a pressing face opposite to the first rotating leaf; and
at least one pressing protrusion formed on the pressing face;
a sliding disk mounted slidably on the pintle, abutting with the rotating disk and having
a pressed face abutting with the at least one pressing protrusion on the rotating disk; and
at least one pressed portion formed on the pressed face and respectively abutting slidably the at least one pressing protrusion, and each one of the at least one pressed portion having an oblique pressed edge abutting slidably with a corresponding pressing protrusion;
a spring mounted around the pintle and abutting against the sliding disk; and
a first fastener mounted on the pintle to hold the first rotating leaf, the rotating disk, the sliding disk and the spring on the pintle; and
a resistance assembly connected to the cover, mounted on the pintle at a second side of the head and comprising
a second rotating leaf mounted rotatably around the pintle;
a pressing disk mounted rotatably around the pintle and attached securely to the second rotating leaf;
a pressed disk mounted slidably on the pintle and abutting with the rotating disk;
a protrusion-recess arrangement formed on faces of the pressing and pressed disks facing to each other;
a biasing assembly mounted around the pintle and abutting against the sliding disk; and
a second fastener mounted on the pintle to hold the second rotating leaf, the pressing disk, the pressed disk and the biasing assembly on the pintle.

10. The object as claimed in claim 9, wherein
the first rotating leaf of the torque assembly further has at least one positioning notch defined in the first rotating leaf; and
the rotating disk of the torque assembly has at least one positioning tab formed on and protruding from the rotating disk and engaging respectively the at least one positioning notch in the first rotating leaf.

11. The object as claimed in claim 10, wherein
the pintle has a non-circular cross section;
the rotating disk of the torque assembly has a circular through hole defined through the rotating disk and mounted rotatably around the pintle; and
the sliding disk of the torque assembly has a non-circular central hole defined through the sliding disk and mounted slidably around the pintle.

12. The object as claimed in claim 11, wherein the torque assembly further has a gasket mounted around the pintle between the spring and the fastener.

13. The object as claimed in claim 12, wherein the torque assembly further has a friction disc mounted around the pintle between the first rotating leaf and the head on the pintle.

14. The object as claimed in claim 9, wherein
the pintle has a non-circular cross section;
the rotating disk of the torque assembly has a circular through hole defined through the rotating disk and mounted rotatably around the pintle; and
the sliding disk of the torque assembly has a non-circular central hole defined through the sliding disk and mounted slidably around the pintle.

15. The object as claimed in claim 9, wherein the torque assembly further has a gasket mounted around the pintle between the first spring and the fastener.

16. The object as claimed in claim 9, wherein the torque assembly further has a friction disc mounted around the pintle between the first rotating leaf and the head on the pintle.

* * * * *